W. J. CARROLL.
PAWL AND RATCHET DEVICE.
APPLICATION FILED MAR. 24, 1915.
1,173,483.
Patented Feb. 29, 1916.
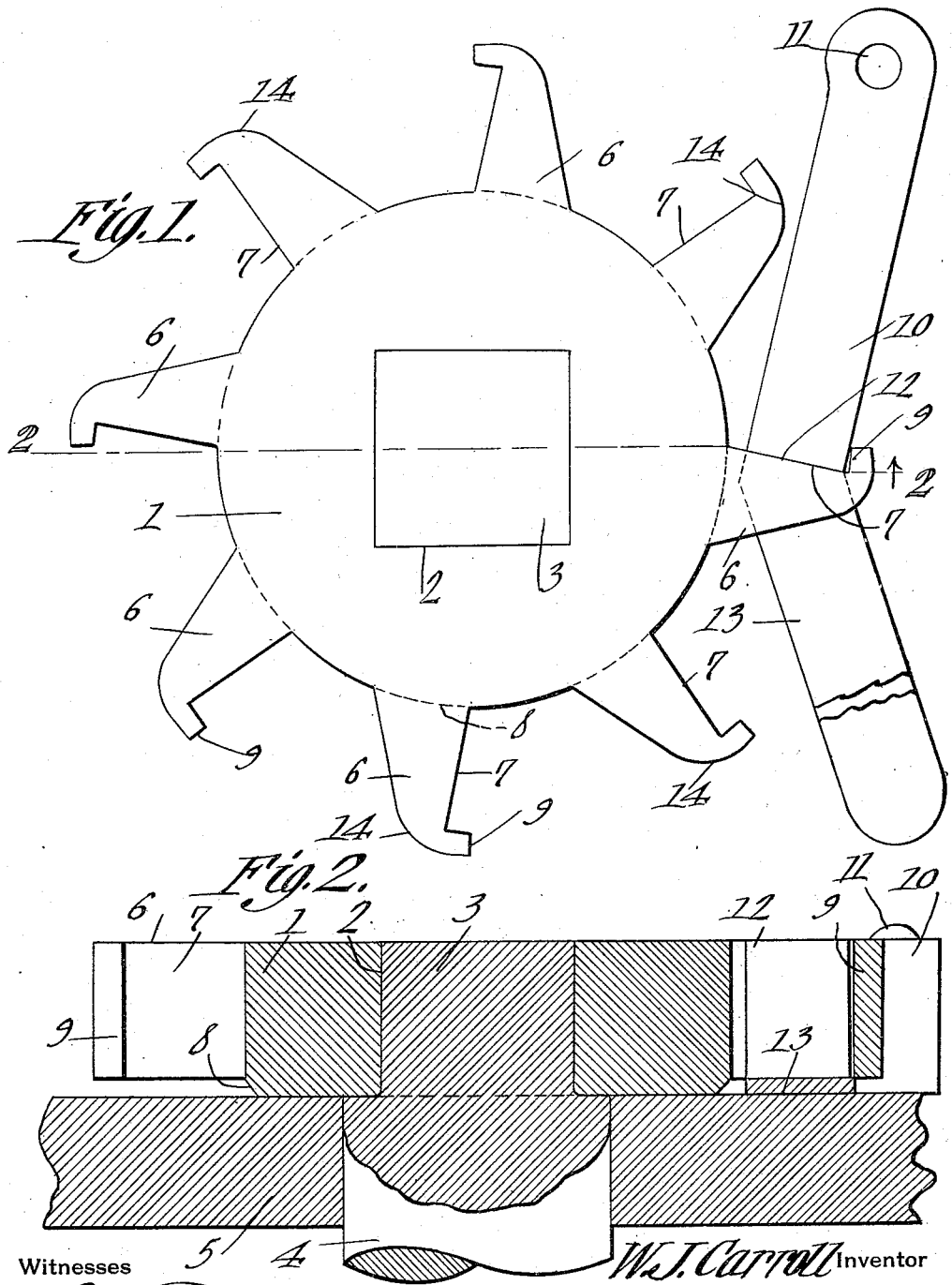

UNITED STATES PATENT OFFICE.

WILBUR JOHN CARROLL, OF YOUNGWOOD, PENNSYLVANIA.

PAWL-AND-RATCHET DEVICE.

1,173,483.   Specification of Letters Patent.   Patented Feb. 29, 1916.

Application filed March 24, 1915. Serial No. 16,646.

*To all whom it may concern:*

Be it known that I, WILBUR JOHN CARROLL, a citizen of the United States, residing at Youngwood, in the county of Westmoreland and State of Pennsylvania, have invented a new and useful Pawl-and-Ratchet Device, of which the following is a specification.

The present invention appertains to pawl and ratchet devices, and aims to provide a pawl and ratchet device of novel and improved construction, whereby the same will be thoroughly efficient in use for its intended purpose, and whereby the pawl or dog is prevented from accidentally disengaging the ratchet wheel, although the pawl may be readily manipulated.

It is also within the scope of the invention to provide a pawl and ratchet device having the features above noted, which at the same time, is comparatively simple and inexpensive in construction, as well as being practical and desirable in use.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawing, wherein:—

Figure 1 is a plan view of the improved pawl and ratchet device, a portion of the pawl being broken away. Fig. 2 is a sectional view taken on the line 2—2 of Fig. 1.

In carrying out the invention, the ratchet wheel 1 is preferably in the form of a single casting, although it may be otherwise formed, and is provided with a central square or non-circular opening 2 for receiving the square or non-circular end 3 of a shaft or other rotating member 4 journaled through a support 5. The periphery of the wheel 1 is provided with an annular series of radially projecting teeth 6 which have the faces 7, and which are of tapered form so as to have relative thick bases or roots. The teeth 6 are thus relatively rigid, and are braced properly to reduce to a minimum, the liability of the teeth being broken off. The inner or under side of the wheel 1 is provided with a central boss 8 arranged to bear against the support 5 and to space the teeth 6 from the support. The teeth 6 are provided at their free ends with lips or flanges 9 projecting from faces 7 of the teeth at approximately right angles relative to said faces, and the lips or flanges 9 are disposed approximately parallel with the axis of the wheel. The lips 9 are for the purpose of preventing the pawl 10 from slipping out of engagement with the teeth 6, and to hold the pawl 10 against the periphery of the wheel 1. The pawl 10 is pivoted to the support 5 at a suitable point thereon, as at 11, and is provided with a blunt or flat free end 12 which is adapted to abut snugly against the faces 7 of the teeth 6. The pawl 10 is provided with a relatively thin extension or handle 13 projecting from its free end 12 at that surface of the pawl 10 adjacent the support 5, and the extension or handle 13 is arranged to lie between the teeth 6 of the ratchet wheel and the support 5. The extension or handle 13 thus projects under the tooth 6 to which the pawl 10 is engaged, to a point beyond the teeth of the ratchet wheel so that the handle 13 may be readily manipulated by the hand or foot, according to the use to which the device is put.

The present device is adapted especially for use in freight cars having drop bottoms, the ratchet wheel being adapted to be carried by the drop bottom roller bar or shaft, and the pawl being adapted to coöperate with the ratchet wheel for preventing the accidental dropping of the bottom of the car, which if it occurred would not only allow the load to be discharged and probably lost, but which would also be liable to derail the car and produce other damage. The pawl 10 may be so mounted as to swing by gravity into engagement with the teeth 6, so that when the ratchet wheel is rotated clockwise as viewed in Fig. 1, the pawl will automatically engage the successive teeth. The free end 12 of the pawl is adapted to abut against the face 7 of the respective tooth, and when the roller or shaft 4 is released, it will move backwardly slightly so that the free end 12 of the pawl and face 7 of the respective tooth will move into abutment, and the respective lip 9 will move over or overlap the outer side of the pawl 10 for holding the pawl in engagement with the said tooth. The boss 8 serves to space the teeth from the support, whereby they will not bear against or interfere with the support, and furthermore this will provide a space between the teeth and support for receiving the handle 13 of the pawl, in order that the pawl may be manipulated through the medium of the handle 13 in an efficient and desirable manner. The free ends of the teeth 6 are preferably rounded, as at 14, from the lips 9 to the backs of the teeth, and the curved ends 14 of the teeth 6 will thus be arranged to bear properly against the pawl 10 to force the pawl 10 away from the ratchet wheel when the ratchet wheel is rotated clockwise as viewed in Fig. 1.

To release the ratchet wheel, the same is rotated clockwise slightly, as viewed in Fig. 1, which will allow the pawl to escape from behind the respective lip 9, and the tooth 6 which then bears against the pawl will serve to swing the pawl outwardly, although when the pawl is released it may be swung away from the ratchet wheel by the hand or foot. It is clearly apparent by reference to Fig. 1, when the ratchet wheel is rotated properly, the lip 9 engaging the pawl will swing away from the end of the pawl, to allow the pawl to swing outwardly readily.

The pawl and ratchet device may be employed upon car brakes, and in other capacities, for which it is adapted.

Having thus described the invention, what is claimed as new is:

1. A ratchet wheel having teeth provided with faces for the abutment thereagainst of a pawl, said teeth having portions at their free ends projecting angularly from said faces to engage and hold the pawl in place.

2. A ratchet wheel having teeth provided with faces for the abutment thereagainst of a pawl, said teeth having lips at their free ends projecting at approximately right angles from the said faces, and parallel with the axis of the wheel.

3. In a device of the character described, the combination with a ratchet wheel having teeth projecting from its periphery and a boss at one side to bear against a support and space the teeth therefrom, of a pawl adapted to be pivoted to the support and having its free end coöperable with the said teeth, the free end of the pawl having a handle arranged to lie between the teeth and support.

4. In a device of the character described, the combination with a ratchet wheel having teeth projecting from its periphery and a boss at one side to bear against a support and space the teeth therefrom, said teeth having portions at their free ends projecting angularly relative to the teeth, of a pawl adapted to be pivoted to the support and having its free end coöperable with the teeth and arranged to be held in engagement with the teeth by said portions, the free end of the pawl having a handle extending therefrom and arranged to lie between said teeth and support.

5. In a device of the character described, the combination with a ratchet wheel having teeth projecting from its periphery and provided with active faces, said wheel having a boss at one side to bear against a support and space the teeth therefrom, said teeth having lips at their free ends projecting angularly from said faces and lying parallel with the axis of the wheel, of a pawl adapted to be pivoted to said support and having a free end adapted to abut against said faces and to be held in place by said lips, the free end of the pawl having a handle extending therefrom and adapted to lie between said teeth and support.

In testimony that I claim the foregoing as my own, I have hereto affixed my signature in the presence of two witnesses.

WILBUR JOHN CARROLL.

Witnesses:
  G. J. CARROLL,
  B. F. MILLER.

Copies of this patent may be obtained for five cents each, by addressing the "Commissioner of Patents, Washington, D. C."